United States Patent [19]
Flannelly

[11] 3,742,770
[45] July 3, 1973

[54] GYROSCOPIC STABILIZER

[75] Inventor: William G. Flannelly, South Windsor, Conn.

[73] Assignee: Kaman Aerospace Corporation, Bloomfield, Conn.

[22] Filed: Feb. 10, 1971

[21] Appl. No.: 114,310

[52] U.S. Cl. .................................. 74/5.34, 74/5.22
[51] Int. Cl. ............................................. G01c 19/18
[58] Field of Search .................... 74/5.22, 5.34, 5.37

[56] References Cited
UNITED STATES PATENTS

| | | | |
|---|---|---|---|
| 2,811,047 | 10/1957 | Christoph | 74/5.34 X |
| 2,845,800 | 8/1958 | Holmes, Jr. | 74/5.34 |
| 2,734,280 | 2/1956 | Christoph | 74/5.34 |
| 2,603,003 | 7/1052 | Braddon | 74/5.34 X |
| 1,050,153 | 1/1913 | Marmonier | 74/5.34 X |

*Primary Examiner*—Manuel A. Antonakas
*Attorney*—McCormick, Paulding & Huber

[57] ABSTRACT

A gyroscopic stabilizing device employs two gyroscopes, each having a gyroscopic mass and a drive motor for rotating the mass about a spin axis to generate gyroscopic stabilizing moments. The gyroscopes are universally pivotally mounted on a support frame so that the spin axes of the gyroscopes may assume a generally aligned relationship in a stable or steady-state condition. A torque-transmitting coupling is connected between the two drive motors of the gyroscopes and reacts the driving torques of the drive motors against one another. The coupling also limits the precessional motions of the gyroscopes to motions of equal magnitude in opposite directions with respect to the support frame. With the precession motions so limited, gyroscopic moments generated by the masses in response to external moments are applied additively to the support frame and stabilize the frame about two orthogonal axes normal to the spin axes. The gyroscopes may be biased toward positions in which the spin axes are aligned by providing springs between the gyroscopes and frame or between the gyroscopes themselves or by providing the torque-transmitting coupling connected between the two gyroscopes with resiliency of its own.

21 Claims, 5 Drawing Figures

PATENTED JUL 3 1973 3,742,770

INVENTOR
WILLIAM G. FLANNELLY

By McCormick, Paulding & Huber
Attorneys

GYROSCOPIC STABILIZER

BACKGROUND OF THE INVENTION

This invention relates to devices for stabilizing objects or bodies against externally applied vibratory forces, and deals more particularly with such devices using gyroscopic masses for producing the stabilizing effect.

The concept of utilizing two gyroscopic masses which rotate in opposite directions about spin axes extending in the same direction to stabilize a body about two orthogonal axes is old. In some of the stabilizing systems belonging to the prior art, signals are derived from the rotational displacements of the stabilized body with respect to a stable gyroscopic platform and are then applied to attitude correction devices to indirectly reposition the body in the desired attitude. In other systems of the prior art, the gyroscopic moments generated by the gyroscope itself are directly applied to a body to hold the body in the stabilized position. An example of a device which may be employed in either of the prior art systems mentioned above is disclosed in U. S. Pat. No. 1,112,997. The patented device employs two fully gimballed, or universally pivoted gyroscopes coupled together so that the gyroscopic stabilizing moments return the stabilized support frame to a preselected attitude or hold the frame in a preselected attitude when external disturbing forces are applied to the frame. Due to the coupling arrangement between the gyroscopes, stabilizing moments about two orthogonal axes are generated by each gyroscope and applied to the frame additively. The coupling restrains the gyroscopes from precessing in the same direction with respect to the support frame on which the gyroscopes are mounted and constrains the gyroscopes to precessional displacements which are equal in magnitude and opposite in direction with respect to the frame. Both side-by-side and coaxial positioning arrangements of the interconnected gyroscopes are possible.

While the general operation of the interconnected gyroscopes of the prior art may be satisfactory in some cases, such devices usually employ complex connecting means to obtain the cooperative action of the gyroscopes. The connecting means are also subject to substantial frictional forces which interfere with the precise operation of the stabilizing device. Furthermore, it is desirable that the precessional displacements of such stabilizing devices be limited during steady or continuous angular movements so that the reference axis can be redirected or oriented in a new direction without generating restoring moments which oppose the reorientation. Systems of this type are characterized by a zero natural frequency. Still further, it is desirable in certain systems to have a stabilizing device which possesses antiresonance characteristics at a dominant frequency to which the stabilizing device is normally exposed. Such features when combined with the basic stabilizing function of the prior art devices produce a valuable and useful stabilization instrument.

SUMMARY OF THE INVENTION

The present invention resides in a gyroscopic stabilizing device having two gyroscopes with gyroscopic masses and drive motors for rotating the masses in opposite directions about spin axes extending in the same direction. A first pivotal mounting means is employed to connect one of the gyroscopes to the support frame so that the gyroscope can precess about at least one axis normal to the spin axis of the gyroscope and a second pivotal mounting means is employed to connect the other gyroscope to the support frame and also permits the second gyroscope to precess about at least one axis normal to the spin axis of the second gyroscope and parallel to an axis about which the first gyroscope precesses. The two pivotal mounting means are additionally arranged so that the axes about which the gyroscopes are permitted to precess extend in the same direction and the gyroscopic masses, when rotated in opposite directions about spin axes extending in the same direction, precess in opposite directions with respect to the support frame. Coupling means interconnect the first and second gyroscopes to react the driving torques of the two drive motors directly between the gyroscopes and additionally restrain the gyroscopes from rotating about axes normal to the spin axes in the same direction with respect to the support frame. The invention also resides in biasing means connected to the gyroscopes to resiliently urge the gyroscopes toward a position in which the spin axes extend in the same direction in opposition to precessional motions. In one embodiment of the invention, the coupling means and the biasing means may be formed from a resilient flexible coupling which restrains the rotation of the gyroscopes in the same direction about axes normal to the spin axes and additionally provides the biasing forces which oppose the precessional motions and urge the gyroscopes toward positions in which the spin axes are aligned.

DESCRIPTION OF PREFERRED EMBODIMENTS

Figure 1:
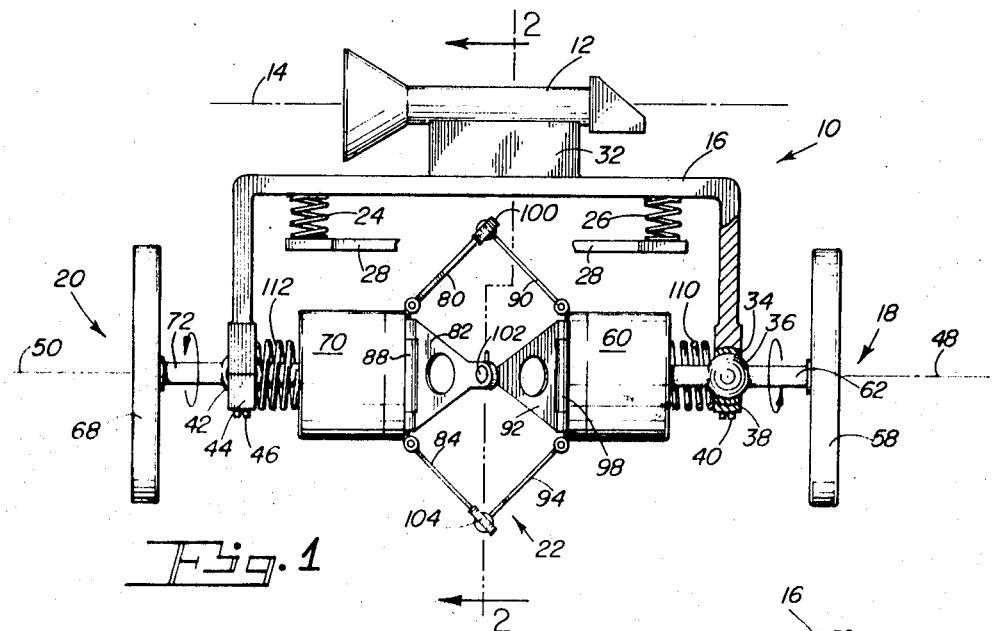
FIG. 1 is a side elevational view of a stabilizing device comprising one embodiment of this invention and employed to hold an optical instrument such as a telescope oriented in a preselected direction.

FIG. 1 shows a gyroscopic stabilizing device, generally designated 10, which incorporates the present invention and which is employed to support an optical instrument 12. The instrument 12 may represent a telescope, camera or other optical instrument having an optical axis 14 which is to be inertially stabilized in a preselected orientation by the gyroscopic stabilizing device 10.

The stabilizing device 10 is composed of a support frame 16, two gyroscopes 18 and 20, which are mounted to the frame 16 for universal pivotal motions with respect to the frame 16, and a flexible spider-type coupling 22 which interconnects the gyroscopes 18 and 20. The frame 16 is connected to two springs 24 and 26 which are mounted at spaced stations near the opposite ends of the frame and which serve as resilient mounts supporting the stabilizing device 10 and optical instrument 12 from a fixed base 28. The gyroscopes 18 and 20 produce gyroscopic stabilizing moments which are applied additively to the frame 16 and hold the frame and instrument 12 with the optical axis 14 oriented in a preselected direction in spite of external vibratory moments which may be imposed on the frame 16 from the base 28. For example, the base 28 may be a support fixture mounted in a moving vehicle such as an airplane or helicopter which experiences turbulence, rotor-induced vibration or other disturbing forces that would adversely effect the orientation of optical axis 14 if transmitted directly to the instrument 12. The springs 24 and 26 therefore assist in the function of holding the optical axis 14 steady by permitting resilient relative movement between the frame 16 and the base 28. Of course, the stabilizing device 10 and instrument 12 need not be mounted to any particular structure but could be held by hand, in which case the gyroscopes 18 and 20 hold the optical axis 14 inertially oriented in a preselected direction in spite of trembling or other body movements of the person holding the instrument. Accordingly, the use of the springs 24 and 26 is not essential but is advantageous where the instrument 12 is mounted to another support fixture.

Turning now to the detailed construction of the stabilizing device 10, the frame 16 has a generally U-shaped configuration with the instrument 12 connected to the upper side of the frame 16 by a pedestal block 32. At one side of the frame 16, a depending section of the frame is connected at its lower end to the gyroscope 18 by means of a ball joint formed by a spherical bushing 34 and a ball 36. The spherical bushing 34 is secured to a depending section of the frame 16 at one side of the frame by means of a clamping bracket 38 and two screws, one of which is shown at 40, which pass through the clamp into the depending section of the frame. In a similar fashion, the gyroscope 20 is connected to a depending section at the opposite side of the frame 16 by means of a ball joint having a ball 42 and a spherical bushing (not visible) which is attached to the lower end of this depending section by means of a clamp 44 and two screws, one of which is shown at 46. The ball joints support the gyroscopes 18 and 20 from the frame so that the spin axes 48 and 50 respectively may extend in the same direction as the optical axis 14 of instrument 12 and may assume an aligned relationship with one another. The ball joints also provide universal pivotal motion between the gyroscopes and the frame 16 so that the gyroscopes may rotate with respect to the frame 16 about axes which are normal to the spin axes 48 and 50. Although the ball joints are shown joining the gyroscopes to the frame, equivalent connectors providing universal motion may be employed.

The gyroscope 18 has polar symmetry about the spin axis 48 and is composed principally of a gyroscopic mass or disc 58 and a drive motor 60 which is connected to the disc 58 through a drive shaft 62 to rotate the disc 58 about the spin axis 48 in the direction indicated by the arrow. The drive shaft 62 is fixed to the ball 36 with the center of gravity of the gyroscope 18 coincident with the center of rotation of the ball. The gyroscope 18 is therefore balanced at the lower end of the frame 16 with the drive motor 60 on one side of the ball 36 and the disc 58 at the other side of the ball 36. The friction forces generated between the ball 36 and bushing 34 may be resolved into a first set of components which lie generally in planes perpendicular to the shaft and a second set of components which lie in planes extending in the direction of the shaft axis or spin axis 48. With the shaft 62 fixed to the ball 36, the ratio of the magnitude of the components in the first set to the magnitude of the components in the second set is equal to the ratio of the spin velocity to the pivoting or tilting velocity with respect to the frame 16. Since the friction forces have a generally fixed magnitude and since the spin velocity is usually much greater than the tilting velocity, the components of the second set which oppose tilting of the gyroscope will be very small. Therefore, the fixed shaft and ball in effect produce a low friction pivotal joint with the frame 16 as far as tilting motions of the gyroscope are concerned.

The gyroscope 20 is disposed at the opposite side of the frame 16 in symmetric relationship with the gyroscope 18 and has the same construction as the gyroscope 18 with polar symmetry about the spin axis 50. The gyroscopic mass or disc 68 is connected through a drive shaft 72 to a drive motor 70 which rotates the disc about spin axis 50 in the direction indicated by the arrow, which is opposite the direction of rotation of disc 58. Both the disc 68 and the motor 70 are supported from the frame 16 by means of the drive shaft 72 which passes through the ball 42 and which is connected to the ball 42 with the center of gravity of the gyroscope 20 coincident with the center of rotation of the ball. The drive motors 60 and 70 may be either electrical or fluid-operated motors supplied with power by means of flexible wires or fluid conduits, respectively. It is important that the wires or conduits supplying power to the motors be flexible so that the universal pivoting motion of the gyroscopes 18 and 20 with respect to the frame 16 takes place with a minimum of friction or other resistance that would apply external moments to the gyroscopes. In this regard, it is assumed that the mass of the coupling 22 is negligible or treated as part of the mass of the gyroscopes so that gravitational or other linear accelerations do not result in external moments being applied to the gyroscopes.

The spider-type coupling 22 is a flexible, torque-transmitting coupling which extends directly between the drive motors 60 and 70 of the gyroscopes 18 and 20 respectively, and reacts the driving torques of the motors 60 and 70 against one another when the motors rotate the discs 58 and 68 in opposite directions about the spin axes 48 and 50, respectively. A slight amount of friction between the gyroscopes and frame 16 prevents the motor casings from rotating about the spin axes with respect to the frame 16; however, to insure that no such rotation takes place retaining springs or one or two flexible, torque-resisting bellows concentric with one or both of the drive shafts 62 and 72 can be interconnected between the frame 16 and one or both of the motors 60 and 70.

Figures 2, 3:
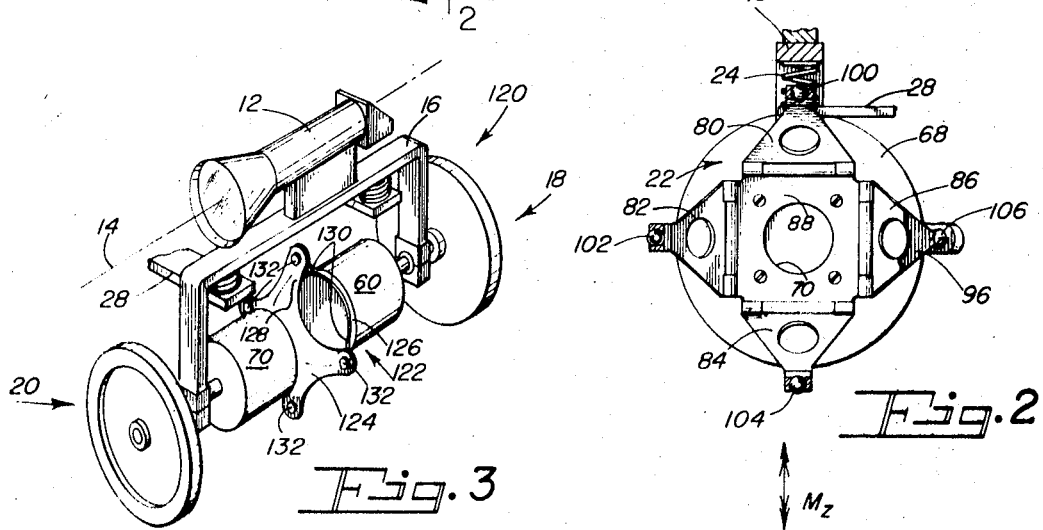
FIG. 2 is a sectional view of the stabilizing device of FIG. 1 as viewed along the section line 2—2 of FIG. 1.
FIG. 3 is a perspective view of a stabilizing device comprising another embodiment of this invention and also employed to hold an optical instrument in a preselected orientation.

The coupling 22 as seen in FIGS. 1 and 2 is composed of four triangular links 80, 82, 84 and 86 hinged to a mounting plate 88 screwed to an axial face of motor 70 and another set of four links 90, 92, 94 and 96 hinged to a mounting plate 98 which is screwed to an axial face of motor 60. The eight links are connected in four pairs, each pair consisting of one link from each mounting plate. The paired links are connected by means of a ball and socket joint 100, 102, 104 or 106 at the projecting ends of the links so that the links of each pair can move in angular relationship with one another while remaining coupled together. With the hinged links connected in pairs by the ball joints, the coupling 22 restrains the gyros 18 and 20 from rotating about an axis normal to the spin axes 48 and 50 in opposite directions with respect to the frame 16. Furthermore, the coupling 22 constrains the gyroscopes 18 and 20, which are symmetrically positioned on the frame 16, to rotate about axes normal to the spin axes 48 and 50 by amounts which are equal in magnitude but opposite in direction or sense with respect to the frame 16. As a consequence of the constraint imposed on the motions of the gyroscopes 18 and 20, gyroscopic stabilizing moments which are generated by the discs 58 and 68 when driven in opposite directions about the generally aligned spin axes 48 and 50 are applied additively to the frame 16 to stabilize the optical instrument 12 and its associated optical axis 14. In other words, external moments applied about axes normal to the spin axes 48 and 50 elicit responses from the two gyros 18 and 20 which cooperate due to the coupling 22 to hold the optical axis 14 oriented in a preselected direction. Additionally, the coupling 22 is a relatively simple, direct connection between the gyroscopes and no friction is generated between the elements of the coupling and the frame as in the prior art devices. The elimination of such friction between the coupling and the frame results in an improvement in gyroscopic stabilizing devices which have interconnected gyroscopes that rotate in opposite directions about spin axes extending generally in the same direction.

A biasing spring 110 is mounted coaxially about the drive shaft 62 and is sandwiched between the depending section of frame 16 adjacent ball 36 and the casing of motor 60 under a slight compressive load so that the gyroscope 18 is urged toward the position shown in FIG. 1 in which the spin axis 48 is aligned with the spin axis 50 of gyroscope 20. In a similar manner, another biasing spring 112 is mounted coaxially about the drive shaft 72 and is sandwiched between the depending section of the frame 16 adjacent ball 42 and the casing of motor 70 to assist the spring 110 in aligning the spin axis 50 with the spin axis 48 of gyroscope 18. Of course, it will be recognized that only one of the springs 110 or 112 is needed to urge the two gyroscopes 18 and 20 into alignment since the coupling 22 constrains the gyroscopes to pivotal motions which are equal in magnitude and opposite in direction with respect to the frame 16.

By resiliently urging the gyroscopes toward an aligned position, the springs 110 and 112 generate moments which oppose precessional displacements of the gyroscopes and in a steady-state condition, such as during the "panning" of the optical device at a constant angular rate, or zero vibratory frequency, the opposing moments limit precession and effectively fix the gyroscopes to the frame. In such condition, the restoring moments of the counter-rotating gyroscopes cancel one another and allow the optical instrument to be panned without gyroscopic resistance. An analytical study of the response characteristics for the stabilizing device 10 with the springs verifies that the biasing springs 110 and 112 do, in fact, produce a zero natural frequency. The analytic study also indicates that the biasing springs provide a rotational antiresonance at a forcing frequency dependent upon the spring constants and the moments of inertia of the gyroscopes. The ability to establish an antiresonance at a selected forcing frequency makes possible the tuning of the stabilizing device 10 to a dominant vibratory disturbing moment which may be found in the environment where the optical instrument 12 is employed. The result is substantially complete cancellation of the dominant moment and a more stable system. Of course, other springs than springs 110 and 112 may be employed to perform the zero natural frequency and antiresonance functions. For example, springs connected between the frame 16 and the coupling 22 or springs connected directly between the motors 60 and 70 or springs adding resiliency to the pivoting motions of the links of the coupling 22 would all serve the same purpose.

Figures 4, 5:
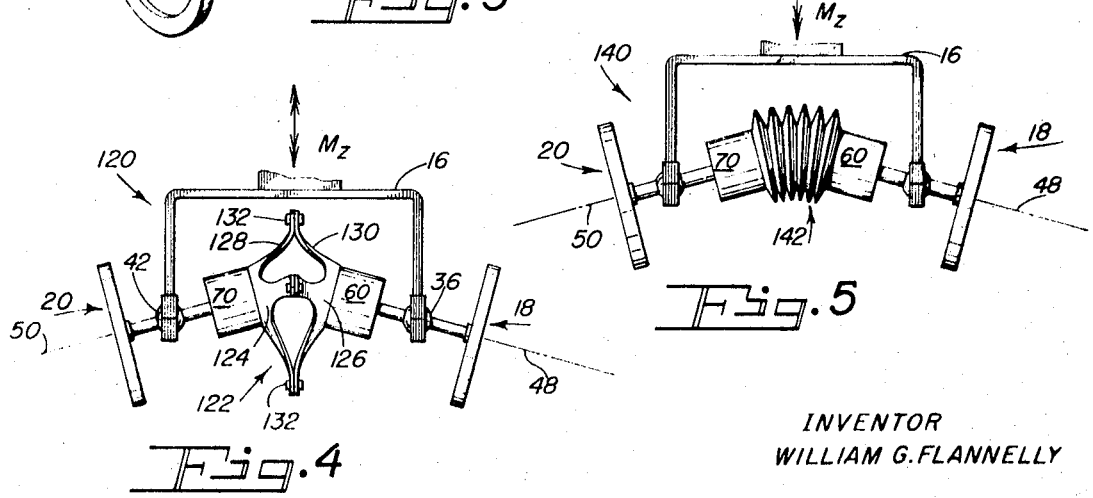
FIG. 4 is a side elevational view of the stabilizing device of FIG. 3 and shows the instantaneous positions of the gyroscopes while reacting to an externally applied moment.
FIG. 5 is a side elevational view of a stabilizing device comprising another embodiment of this invention and also shows the instantaneous positions of the gyroscopes while reacting to an externally applied moment.

An alternate embodiment of the gyroscopic stabilizing device, generally designated 120, is shown in FIGS. 3 and 4. The frame 16, the gyroscopes 18 and 20 and the ball joint suspension of the gyroscopes from the depending ends of frame 16 are the same as that shown in FIG. 1. However, a resilient, flexible coupling 122 having no friction joints is substituted for the spider-type coupling 22 and biasing springs 110 and 112.

The coupling 122 is composed of two multi-fingered elastic plates 124 and 126 which are connected to the motors 70 and 60 respectively. The plate 124 includes four resilient fingers 128, 128 and the plate 126 similarly includes four fingers, 130, 130. The fingers 128, 128 and 130, 130 are mated in pairs, each pair consisting of a finger 128 from plate 124 and a finger 130 from plate 126, and the paired fingers are held together at their extremities by means of bolts 132, 132. The coupling 122 provides substantially the same kinematics and torque-reacting characteristics as the coupling 22 of FIG. 1 and additionally provides the resiliency for tuning the device 120 to dominant disturbing frequencies and for resiliently biasing the gyroscopes 18 and 20 toward an aligned position of the spin axes or limiting precession at zero frequency in the same manner as the biasing springs 110 and 112 in FIG. 1. The stabilizing device 12 is, therefore, functionally equivalent to the device 10 of FIGS. 1 and 2.

In FIG. 4, the gyroscopic stabilizing device 120 is shown at an instant of time with the gyroscopes 18 and 20 tilted with respect to the horizontal reference plane which passes through the centers of the balls 36, 42 normal to the depending sections of the frame. The gyroscopes assume the tilted positions while reacting to an external vibratory moment $M_z$ applied to the frame 16 about a vertical axis. It will be noted that the resilient coupling 122 is distorted and resiliently opposes the tilting of the gyroscopes 18 and 20 about horizontal axes normal to the spin axes of the gyroscopes. The coupling 122 also restrains the gyroscopes from rotating with respect to the frame in the same direction about vertical axes as the moment $M_z$ attempts to rotate the frame. The restraint causes the moment $M_z$ to be transmitted to the gyroscopes through the frame and the tilting motions of the gyroscopes represent the precessional displacements of the gyroscopes 18 and 20 at an instant when the gyroscopes are experiencing the moment $M_z$. Assuming that the gyroscopes have the same construction and equal spin rates in opposite directions, the constraint that the coupling imposes on the gyroscopes, which constraint limits displacements of the gyroscopes to rotational displacements of equal magnitude and opposite sense with respect to the frame, results in the generation of equal gyroscopic restoring moments having a sum equal to the magnitude of moment $M_z$ and a sense opposite the sense of moment $M_z$. Since the external moment $M_z$ is a vibratory moment, the gyroscopes precess back to the aligned position shown in FIG. 3 by the time that the sense of the moment $M_z$ reverses, and during the subsequent half cycle of the moment $M_z$, the precession of the gyroscopes and the restoring moments reverse also. The restoring moments, therefore, tend to hold the frame and the optical axis 14 of the instrument 12 supported on the frame oriented in a given direction in opposition to the external vibratory moment $M_z$. The stabilizing device 120 also opposes external moments applied to the frame about horizontal axes normal to a line extending between the centers of the ball joints supporting the gyroscopes from the frame 16. The stabilizing device 120 is therefore capable of opposing any moment which would tend to change the orientation of the optical axis 14 of the instrument 12.

FIG. 5 shows a further embodiment of the gyroscopic stabilizing device, designated by the reference numeral 140, at an instant in time during which the device is reacting to an external moment $M_z$. Again, the construction of the gyroscopes 18 and 20 and the ball joint suspension of the gyroscopes in frame 16 is the same as that shown in FIGS. 1 and 3 except that a coupling 142 between the motors 60 and 70 of the gyroscopes has been substituted in place of either the coupling 22 in FIG. 1 or the coupling 122 in FIG. 3.

The coupling 142 comprises a flexible, metallic bellows which is connected at its axial ends to the confronting axial faces of the casings of motors 60 and 70. The bellows has no friction joints and possesses the torque-reacting characteristics of the couplings 22 and 122 as well as the resiliency characteristics of the coupling 122 for tuning the device 140 to produce antiresonance and for urging the gyroscopes 18 and 20 toward aligned positions of the spin axes and limiting precession in the steady-state condition. The coupling also provides basically the same restraint to the motions of the gyroscopes as that offered by the couplings in the other embodiments of the stabilizing device, that is, the gyroscopes are restrained from rotating with respect to the frame in the same direction about axes normal to the spin axes and are constrained to rotate by mounts which are equal in magnitude and opposite in sense or direction with respect to the frame. The stabilizing device 140 is therefore the functional equivalent of devices 10 in FIG. 1 and device 120 in FIG. 3 and the response of the gyroscopes 18 and 20 to the external moment $M_z$ is basically the same as that of the device 120 shown in FIGS. 3 and 4. The gyroscopes 18 and 20 assume the same tilted attitude as that shown in FIG. 4 and produce the same additive effect of the gyroscopic restoring moments for holding or maintaining the frame 16 in its stabilized position.

While the present invention has been described in several embodiments, it will be understood that numerous modifications and substitutions can be made without departing from the spirit of the invention. As indicated above, the resilient characteristics which provide zero natural frequency and antiresonance characteristics in the stabilizing device may be provided by the inherent resiliency of the coupling itself or by the springs such as those shown in FIG. 1 which are independent of both the coupling and the gyroscopes. Gimballing or flexible support systems may be substituted for the ball joints and will provide equivalent freedom of motion of the gyroscopes. Accordingly, the present invention has been described in several different embodiments merely by way of illustration rather than limitation.

I claim:

1. A gyroscopic stabilizing device comprising a frame; a first gyroscopic unit and a second gyroscopic unit composed respectively of a first gyroscopic mass rotatable about a spin axis and a second gyroscopic mass rotatable about a spin axis normally aligned with the spin axis of said first gyroscopic mass and first and second drive motor means connected respectively to said first and second masses for rotating said masses in opposite directions with respect to one another about the normally aligned spin axes; first pivotal mounting means connected between said first gyroscopic unit and said frame to permit said first gyroscopic unit to rotate with respect to said frame about at least one axis normal to the spin axis of said first gyroscopic mass; a second pivotal mounting means connected between said second gyroscopic unit and said frame to permit said second gyroscopic unit to rotate with respect to said frame about at least one axis normal to the spin axis of said second gyroscopic mass and parallel to an axis about which said first gyroscopic unit is permitted to rotate by said first pivotal mounting means; and coupling means interconnecting said first and second gyroscopic units for reacting the driving torques of said first and second drive motor means between said first and second gyroscopic units and for restraining said first and second units from rotating with the same sense with respect to said frame about parallel axes normal to the spin axes.

2. A gyroscopic stabilizing device as defined in claim 1 wherein said coupling means comprises means for constraining the motions of said gyroscopic units to precessional motions of substantially equal magnitudes in opposite directions with respect to said frame about the axes normal to the common spin axis.

3. A gyroscopic stabilizing device as defined in claim 1 wherein said first pivotal mounting means comprises means for pivoting said first gyroscopic unit universally with respect to said frame; and said second pivotal mounting means comprises means for pivoting said second gyroscopic unit universally with respect to said frame.

4. A gyroscopic stabilizing device as defined in claim 3 wherein said first pivotal mounting means is a first ball joint and said second pivotal mounting means is a second ball joint.

5. A stabilizing device as defined in claim 1 wherein the frame includes a plurality of resilient mounts located at spaced positions for resiliently mounting said frame.

6. A gyroscopic stabilizing device as defined in claim 1 wherein said first pivotal mounting means comprises a first universally pivotal connector interposed between said first gyroscopic unit and said frame; said second pivotal mounting means comprises a second universally pivotal connector interposed between said second gyroscopic unit and said frame; and said coupling means comprises a flexible, torque-transmitting coupling interconnecting said first and second drive motor means of said first and second gyroscopic units.

7. A gyroscopic stabilizing device as defined in claim 6 wherein said first universally pivotal connector is joined to said first gyroscopic unit at a position on said first unit in which the center of the universal pivotal motion of said first connector coincides substantially with the center of gravity of said first gyroscopic unit; and said second universally pivotal connector is joined to said second gyroscopic unit at a position on said second unit in which the center of the universal pivotal motion of said second connector coincides substantially with the center of gravity of said second gyroscopic unit.

8. A stabilizing device as defined in claim 6 wherein said flexible, torque-transmitting coupling comprises an expandable, spider-type linkage extending between said drive motor means.

9. A stabilizing device as defined in claim 6 wherein said flexible coupling includes two multi-fingered, elastic plates and means for connecting the ends of the fingers on one of said plates respectively to the ends of the fingers on the other of said plates.

10. A stabilizing device as defined in claim 6 wherein said flexible coupling comprises a bellows extending between said first and second drive motor means.

11. A gyroscopic stabilizer comprising a structural support; a pair of gyroscopes each having polar symmetry about the respective spin axes of said gyroscopes; means for individually pivotally mounting each gyroscope of said pair to said structural support to permit the spin axes to extend in a given direction, the mounting means including a first universal connector joined to the structural support and the one gyroscope of said pair to permit the one gyroscope to universally pivot with respect to said structural support about axes normal to the spin axis of said one gyroscope and a second universal connector joined to the structural support and the other gyroscope of said pair to permit the other gyroscope to universally pivot with respect to said structural support about axes normal to the spin axis of said other gyroscope; coupling means connected between said gyroscopes for restraining said gyroscopes from simultaneous pivotal movements with the same sense about the axes normal to the spin axes; and biasing means connected to said pair of gyroscopes for urging said gyroscopes toward positions in which said spin axes of gyroscopes extend in the given direction.

12. A gyroscopic stabilizer as defined in claim 11 wherein the first universal pivotal connector is joined to said one gyroscope with the center of the universal pivotal movement of said first connector substantially coincident with the center of gravity of said one gyroscope and the second universal pivotal connector is joined to said other gyroscope with the center of the universal pivotal movement of said second connector substantially coincident with the center of gravity of said other gyroscope.

13. A gyroscopic stabilizer as defined in claim 11 wherein said coupling means comprises means for constraining the universal pivotal movement of said gyroscopes to simultaneous pivotal movements equal in amount and opposite in sense with respect to said structural support.

14. A gyroscopic stabilizer as defined in claim 13 wherein said biasing means comprises resilient biasing means connected between said gyroscopes.

15. A gyroscopic stabilizer as defined in claim 14 wherein said means for individually pivotally mounting comprises means permitting said gyroscopes to assume positions in which said spin axes are aligned; and wherein said biasing means comprises resilient coupling means connected between said gyroscopes of said pair for biasing said gyroscopes toward the positions in which said spin axes are aligned; and said coupling means also comprises said resilient coupling means connected between said gyroscopes of said pair.

16. A gyroscopic stabilizer as defined in claim 13 wherein said biasing means comprises resilient biasing means connected between said structural support and said pair of gyroscopes.

17. A gyroscopic stabilizer as defined in claim 16 wherein said means for individually pivotally mounting comprises means permitting said pair of gyroscopes to assume positions in which said spin axes are aligned and said resilient biasing means comprises means for resiliently biasing said gyroscopes toward the positions in which said spin axes are aligned.

18. A gyroscopic stabilizer as defined in claim 11 wherein said means for individually mounting comprises means permitting said gyroscopes to assume positions in which said spin axes are aligned; and wherein a rotatable mass and a drive motor connected to said mass are included in each of said gyroscopes; and said coupling means is a flexible, torque-transmitting coupling connected between the drive motors of the respective gyroscopes.

19. A gyroscopic stabilizer comprising a structural frame; a pair of gyroscopes, each gyroscope having a spin axis; means for universally mounting each gyroscope of said pair to said structural frame to permit the spin axes of said gyroscopes to extend in a given direction and to permit the gyroscopes to rotate about precession axes perpendicular to the spin axes of the respective gyroscopes; coupling means connected between said gyroscopes of said pair for restraining said gyroscopes from simultaneous rotational movements having the same sense about precession axes extending in the same direction; and biasing means connected to said pair of gyroscopes for urging said gyroscopes toward positions in which said spin axes of said gyroscopes extend in the given direction.

20. A gyroscopic stabilizer as defined in claim 19 wherein said means for restraining comprises means for constraining said gyroscopes to simultaneous rotational movements having the same sense about precession axes extending in the same direction.

21. A gyroscopic stabilizer as defined in claim 20 wherein said means for constraining said gyroscopes and said biasing means include a resilient coupling interconnecting said gyroscopes of said pair.

* * * * *